3,608,408
DEVICE FOR REGULATING A CAM-CONTROLLED MACHINE TOOL
Franz Reiners, Post Berg, Erkelenz-Land, and Georg Walk, Rheydt, Germany, assignors to A. Monforts, Monchen-Gladbach, Germany
Filed Dec. 19, 1969, Ser. No. 886,666
Claims priority, application Germany, Dec. 21, 1968, P 18 16 401.7
Int. Cl. B23b 25/06
U.S. Cl. 82—21
4 Claims

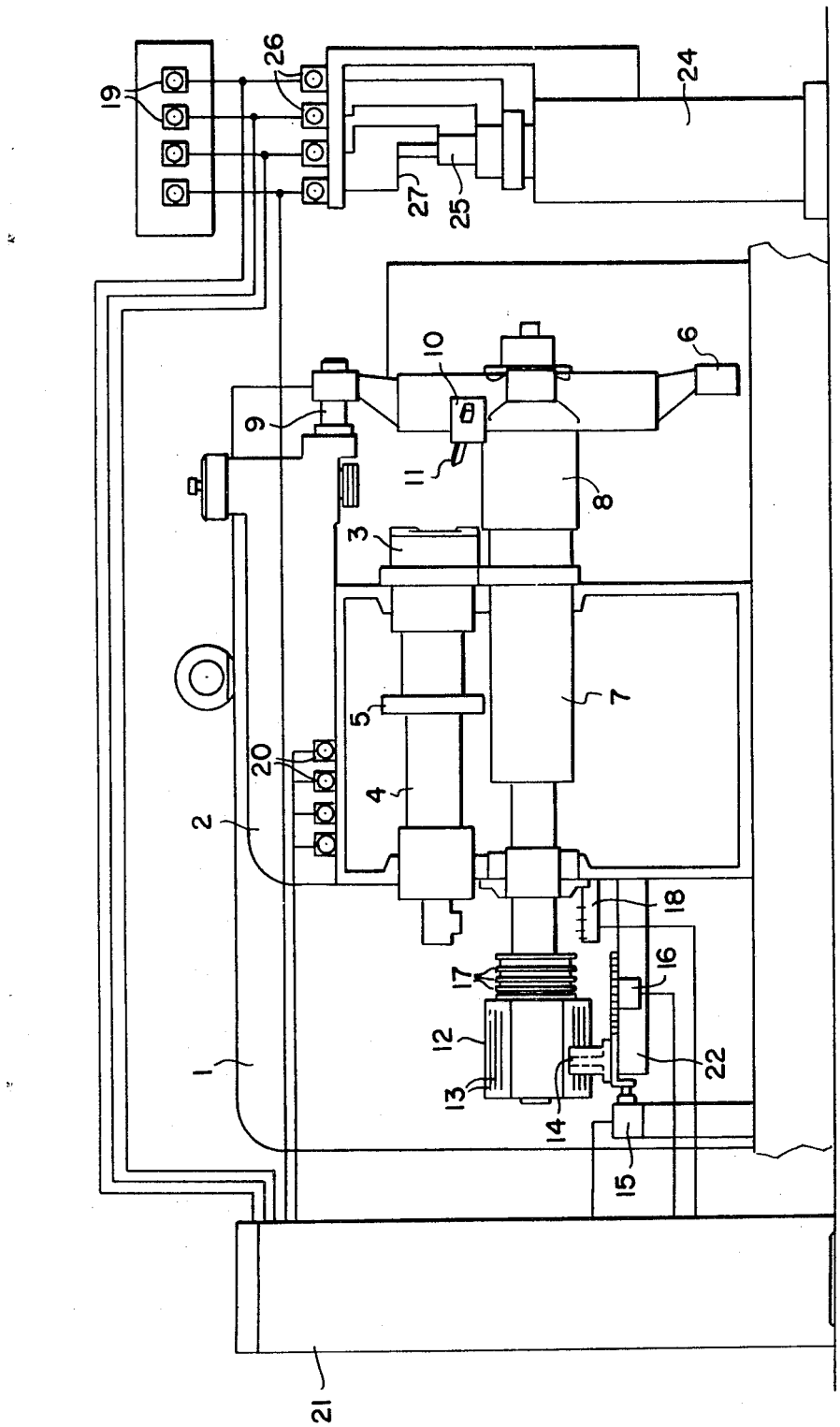

ABSTRACT OF THE DISCLOSURE

Device for regulating a cam-controlled machine tool includes measured value transmitter means connected to nominal value potentiometer means for transmitting a signal to the latter in accordance with a measured machining dimension of a control workpiece for automatically preadjusting the nominal value potentiometer means to fix the end position of the multitool-carrying turret of the machine tool, so that servomotor means operatively connected to the nominal value potentiometer means and to actual value potentiometer means which sense the actual axial position of a terminal switch relative to a control drum connected to the turret, are automatically actuable in response to a difference of the nominal and actual values for relatively displacing the terminal switch and control drum to adjustably displace the turret axially to its end position.

---

Our invention relates to device for regulating a cam-controlled machine tool, especially a turret lathe with a working spindle for a workpiece and a turret adjustable to various angular settings and in the longitudinal direction thereof.

In our copending application Ser. No. 839,912, filed July 8, 1969, we disclose such a regulating device wherein nominal value potentiometers are respectively coordinated with each of the operative settings of the turret for fixing the end position of the turret in the axial direction thereof by displacing a terminal switch.

In our aforementioned copending application, we indicated that it was our objective to reduce the downtime and to simplify the adjustment of the tools, especially the neutral point position thereof, for a machine tool of the foregoing type. This objective was attained by effecting control of the neutral point position of the tool parallel to the turret axis by superimposing on the controlling movement an adjustment of the axial end position of the turret, a nominal value potentiometer being coordinated with each operative setting of the turret.

It is an object of our present invention, to provide device for regulating a cam-controlled machine tool which further simplifies operation or servicing of the machine tool and greatly reduces the work required by the operating or servicing personnel.

With the foregoing and other objects in view, we provide in accordance with our invention, in a device for regulating a cam-controlled machine tool having a rotary working spindle for a workpiece and a multitool-carrying turret adjustable to various angular settings and controllably displaceable in axial direction thereof which includes a control drum having a unitary construction with the turret so as to be angularly and axially movable therewith, a terminal switch mounted adjacent the control drum, the terminal switch and the control drum being relatively displaceable, nominal value potentiometer means preadjustable for fixing the end position of the turret in axial direction thereof, actual value potentiometer means for sensing the actual position of the terminal switch in the axial direction, servomotor means operatively connected to the nominal and actual value potentiometer means and to the terminal switch and being automatically actuable in response to a difference between the nominal and actual values for relatively displacing the terminal switch and the control drum so as to adjustably displace the turret in axial direction to the end position thereof whereby the nominal and actual values are equal, the improvement therein comprising measured value transmitter means for transmitting a signal to the nominal value potentiometer means in accordance with a measured machining dimension of a control workpiece for automatically preadjusting the nominal value potentiometer means to fix the end position of the turret.

An advantage derived from the invention of the instant application is that for machining of a plurality of identical workpieces, the desired machining dimension or dimensions need only be present or preadjusted once in the nominal value potentiometer means and, whenever a deviation from that dimension or dimensions should occur for one of the plurality of workpieces, correction of the axial end position of the turret will then occur automatically, so that further adjustment of the nominal value potentiometer means is no longer necessary.

In accordance with another feature of our invention, the nominal value potentiometer means comprises a plurality of individual potentiometers, each coordinated with one of a plurality of angular settings of the turret wherein a different operation is performable on the workpiece, for fixing the end position of the turret in the axial direction thereof for the respective setting of the turret and the measured value transmitter means comprises a plurality of transmitters, each coordinated with a respective potentiometer.

In order to transfer the measured results to the measured value transmitter without intervention by any operating personnel and to thereby avoid faulty adjustments, according to a further feature of our invention, we provide in coordination with each measured value transmitter, at least one measurement sensor for sensing the machining dimension of the control workpiece.

In accordance with an additional feature of our invention, we provide a control apparatus connected in common with the measurement sensors, the measured value transmitters and the nominal value potentiometers, the control apparatus being expediently located in the vicinity of the machine tool chuck.

Other features which are considered as characteristic for the invention are set forth in the appended claims.

Although the invention is illustrated and described herein as embodied in device for regulating a cam-controlled machine tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of the drawing showing diagrammatically and in elevational view, a turret lathe equipped with the regulating device of our invention.

Referring now to the drawing, there is shown a machine tool of the same type disclosed in our aforementioned copending application i.e. having the form of a turret lathe with a spindle stack 2 wherein a working spindle 4 carrying a chuck 3 is rotatably mounted. A gear 5 secured to the working spindle 4 meshes with a non-illustrated conventional drive mechanism transmission for rotating the spindle 4. A turret 8 having a four-armed turret star or turnstile 6 and a turret shaft 7 and being angularly adjustable to four operative settings as well as being axially displaceable, is mounted below the working spindle 4. The turret turnstile 6 is provided with a bore at the extremity of the four arms thereof, through which an indexing pin 9, mounted on the spindle stack 2 is insertable for fixing the turnstile 6 in the respective four operative settings thereof. A tool 11 is mounted in a holder 10 on the turret turnstile 6 substantially at the level of the working spindle 4. Axial movements of the turret 8 are controlled by a control drum 12 mounted on the turret shaft 7. The drum 12 is provided with cams 13 which act upon a terminal switch 14 whose position in axial direction relative to the control drum 12 determines the end position of the turret 8 and the revolver turnstile 6 and therewith the neutral point location of the tool 11 secured to the turret turnstile 6. This neutral point location can be controlled by relative displacement of the terminal switch 14 and the control drum 12.

The adjustment of the end position of the turret 8 results from a displacement effected by a servomotor 15 of the terminal switch 14 in direction parallel to the axis of the control drum 12. The axial position of the terminal switch 14 is sensed or detected by an actual value potentiometer 16. Four adjustable cams 17 are additionally provided on the control drum 12 for actuating four contacts, respectively, of a terminal switch 18. In the illustrated case of a turret lathe with a four-armed turret turnstile, there is provided for each of the four operative settings of the turret, respectively, a cam 17 and a contact of the terminal switch 18 actuable by the respective cam 17 for registering the respective operative position of the turret. A nominal value potentiometer 19 is coordinated respectively with each of the four contacts of the terminal switch 18 and therewith with each of the four operative settings, respectively, of the turret 8. Means for automatically preadjusting the nominal value potentiometers 19, in accordance with the present invention, will be described hereinafter in greater detail. A respective manually actuable selector switch 20 is coordinated with each of the nominal value potentiometers 19 for raising the tool from the workpiece. All of the controls and circuitry for adjusting the neutral point location, registering the turret setting, raising the tool from the workpiece as well as reversibly controlling the servomotor 15 are located on or in a switch cabinet 21 and are of conventional construction and design readily known to a man of ordinary skill in the art.

The operating cycle for the machine tool employing the aforedescribed regulating device is carried out in the following manner. The four nominal value potentiometers 19 are preadjusted in the hereinafter described manner to the desired value, for example, to determine or fix the machined dimension, such as the operative or cutting depth of the tool at the workpiece. After a machining step has been completed, the turret 8 is released from the indexing pin 9 by being withdrawn toward the right-hand side of the figure, and is turned through an angle of 90° about the longitudinal axis thereof. In this withdrawn position of the turret 8, the cams 17 on the control drum 12, are located in the vicinity of the terminal switch 18 so that the cam 17 corresponding to the new operative setting of the turret 8 actuates the contact at the terminal switch 18 appertaining thereto and, thereby switches one of the nominal value potentiometers 19 into the regulating or control circuit through the non-illustrated wiring of the switch cabinet 21. The turret 8 is then pushed back toward the working spindle 4 and is again fixed in an operative position by the indexing pin 9, similar to the manner shown in the figure, except that the turret 8 has been turned through an angle of 90° in a plane perpendicular to the plane of the drawing. The working spindle 4 with the workpiece clamped in the chuck 3, is placed in rotation as the turret 8 and the working tool 11 thereof are simultaneously fed in the axial direction i.e. in the plane of the drawing. The machining operation, such as a turning operation, for example, is then carried out until the turret 8 reaches its axial end position which is determined by the terminal switch 14.

If the values of the preadjusted nominal value potentiometers 19 and of the actual value potentiometers 16 registering the setting or location of the terminal switch 14 are analogous, then the terminal switch 14 is in the desired location.

If, however, the values of both potentiometers 16 and 19 are not analogous, a displacement of the terminal switch 14 by the servomotor 15 is produced through the circuitry and controls of the switch cabinet 21 until the reading of the actual value potentiometer 16 is in agreement with the reading of the nominal value potentiometer 19, and the terminal switch 14 is located in the desired position thereof.

When the turret 8 reaches its end position in the axial direction thereof, the terminal switch 14 is actuated by one of the cams 13, the operating feed of the turret 8, i.e. in the axial direction when performing a turning operation, for example, is halted and the turret 8 is returned in axial direction, i.e. displaced toward the left-hand side of the figure, and the subsequent adjustment thereof, into the next operative setting is effected.

As is well known, facing operations can also be performed on turret lathes, for example, by means of slides displaceable transversely to the working spindle 4. In order to prevent the formation of grooves in the workpiece during the return motion of the slide, an additional resistance is cut into the regulating or control circuit by actuating that selector switch 20 which corresponds to the then operative setting of the turret 8 when the latter has attained its axial end position so that the readings of the respective potentiometers 16 and 19 become analogous no longer. They are therefore again adjusted and balanced by displacing the terminal switch 14 so that the turret 8 is shoved back a specific distance opposite to the axial direction of feed thereof and the tool 11 is raised from the workpiece. Since the resistance added to the regulating circuit is the same for all the operative settings of the turret 8, all of the tools carried by the turret turnstile 6 are raised the same distance. By switching the selector switch 20 off, if desired, raising of the tool from the workpiece can be prevented.

Once the nominal value potentiometer 19 is adjusted, the turret 8 is set so that the tool performing the operation automatically provides the same machined dimension or operating or cutting depth in a number of identical workpieces that are machined in succession. To calibrate or standardize a number of identical machines, they can be adjusted to absolutely the same operating or cutting depth with the aid of the regulating device.

If a change produced by wear in the neutral point location of a single tool is to be compensated, it is sufficient to effect an adjustment of the end position of the turret in the respective operative setting. When the neutral point location of all the tools is changed, for example, after the chuck has been suitably machined, an adjustment of the end position of the turret to an equal value for all of the operative settings must be carried out.

Furthermore, instead of four nominal value potentiometers 19, only a single one need be provided, in which case, either the end position of the turret is simultaneously adjusted, in the hereinafter described manner, to the same extent for all the operative settings or after each adjustment of the turret into the next operative setting, a new preadjustment of nominal value potentiometer must be effected.

In contrast to the manually preadjustable nominal value potentiometer in the regulating device of our aforementioned copending application, the nominal value potentiometers 19 of the improved device of the instant application are connected to respective measured value transmitters 26 responsive to respective schematically illustrated measurement sensors 27 of conventional construction and connected to a control apparatus 24 constructed to survey a control workpiece 25 and to determine machined dimensions thereof.

The operation of the machine tool aforedescribed herein is substantially the operation effected with the regulating device of our aforementioned copending application. Hereinafter are described the particularities in the operation of the improved device of the invention in the instant application.

When machining the first of a plurality of identical workpieces, the desired axial machining depths are preset or preadjusted at the four nominal value potentiometers 19 and the machining cycle is completed in the previously known manner. If a sample workpiece is available, it is placed in the control apparatus 24. After the first workpiece has been machined, it is removed from the chuck, is placed on the control apparatus 24 instead of the sample workpiece, and the next workpiece to be machined is clamped in the chuck. One of the nominal value potentiometers 19 and a respective measured value transmitter 26 with its corresponding measuring sensor 27 are coordinated with each operative setting of the turret 8.

When the values of the preset or preadjusted nominal value potentiometers 19 and of the measurement transmitters 26, to which the machining dimension sensed by the measurement sensor 27 is transmitted, are analogous, i.e. when the machined workpiece 25 has the desired machining dimension, a correction of the axial end position of the tool turret 8 by displacement of the terminal switch 14 is unnecessary.

If the values of the nominal value potentiometer 19 and of the measured value transmitter 26 are non-analogous, as in the case, for example, when there is a deviation in the machining dimension caused by wear of the tool, a detuning of the nominal value potentiometer 19 over the respective measured value transmitter 26 and a corresponding adjustment of the end switch 14 are effected. The workpiece found in the chuck will exhibit the desired machining dimension for the following measurement.

The measuring operation can be carried out after each change of the workpiece, the next previously machined workpiece being mounted each time on the control apparatus 24. In actual practice, however, this is not always necessary, so that the measuring operation can be limited for example, to every tenth workpiece.

We claim:

1. In a device for regulating a cam-controlled machine tool having a rotary working spindle for a workpiece and a multi-tool-carrying turret adjustable to various angular settings and controllably displaceable in axial direction thereof which includes a control drum having a unitary construction with the turret so as to be angularly and axially movable therewith, a terminal switch mounted adjacent the control drum, the terminal switch and the control drum being relatively displaceable, nominal value potentiometer means preadjustable for fixing the end position of the turret in axial direction thereof, actual value potentiometer means for sensing the actual position of the terminal switch in the axial direction, servomotor means operatively connected to the nominal and actual value potentiometer means and to the terminal switch and being automatically actuable in response to a difference between the nominal and actual values for relatively displacing the terminal switch and the control drum so as to adjustably displace the turret in axial direction to the end position thereof, whereby the nominal and actual values are equal, the improvement therein comprising measured value transmitter means connected to the nominal value potentiometer means for transmitting a signal to the nominal value potentiometer means in accordance with a measured machined dimension of a control workpiece for automatically preadjusting the nominal value potentiometer means to fix the end position of the turret.

2. Device according to claim 1, wherein the nominal value potentiometer means comprise a plurality of individual potentiometer, each coordinated with one of a plurality of angular settings of the turret, wherein a different operation is performable on the workpiece, for fixing the end position of the turret in the axial direction thereof for the respective setting of the turret, and the measured value transmitter means comprising a plurality of transmitters each coordinated with a respective potentiometer.

3. Device according to claim 2, comprising at least one measurement sensor for sensing the machining dimension of the control workpiece coordinated with each measured value transmitter.

4. Device according to claim 3, comprising a control apparatus connected in common with said measurement sensors, said measured value transmitters and said nominal value potentiometers.

References Cited

UNITED STATES PATENTS

| | | | |
|---|---|---|---|
| 2,118,024 | 5/1938 | Potter et al. | 82—21B |
| 2,656,589 | 10/1953 | Greene et al. | 82—21B |
| 3,010,348 | 11/1961 | Swanson et al. | 82—21X |
| 3,259,002 | 7/1966 | Huff et al. | 82—21B |

LEONIDAS VLACHOS, Primary Examiner

U.S. Cl. X.R.

77—25